Patented Sept. 3, 1935

2,013,318

UNITED STATES PATENT OFFICE 2,013,318

ESTER OF DIHYDRIC AND POLYHYDRIC ALCOHOLS

Ludwig Rosenstein and Walter J. Hund, San Francisco, Calif.

No Drawing. Application January 22, 1929, Serial No. 334,350

6 Claims. (Cl. 260—8)

This invention relates generally to the manufacture of condensate products. It relates particularly to the manufacture of certain esters which will not polymerize.

The various esters formed by the reaction between the polycarboxylic acids and glycerol are well known and have been frequently described in the literature. These esters have the characteristic of polymerizing to form products which are infusible glass-like solids and which, in contradistinction to the unpolymerized esters are insoluble in the usual organic solvents such as acetone, ethyl acetate, benzol, and the like. Because of their insolubility these polymerized products cannot be used as material in making lacquers or varnishes or as substitutes for the natural resins and gums. Their principal use, to which they are particularly adapted because of their ability to polymerize, is in making molded articles. Thus in prior manufacturing processes the reaction between the polycarboxylic acid or its anhydrid and glycerol is carried to the point where polymerization of the esters formed by the reaction may follow. The reaction product is then placed in the mold and polymerization completed. For such products the completion of esterification before polymerization of the ester formed as a reaction product sets in is not important. Esterification need only have progressed sufficiently to render the intermediate product suitable for molding.

For many purposes it is desirable to have a final reaction product which is fusible, soluble, and which will not subsequently polymerize. While we have found that it is possible to stop the reaction between the polycarboxylic acid and glycerol before the reaction product has begun to polymerize, it is difficult in prior processes to control the reaction so as to always end with a product of definite flow point, having substantially the same softening range, and with substantially the same viscosity at the flow point. It is desirable in certain instances, to obtain as a final product an ester in the form of a glass-like solid which may be finely divided and when in this state will remain a free flowing powder which will not coalesce at ordinary temperatures. It has been found to be extremely difficult to obtain esters which are characterized by these properties from among that class of ester which polymerize.

It is therefore an object of this invention to devise a novel process which may be expediently employed for the manufacture of esters.

It is a further object of this invention to provide, as a new composition of matter, an esterification product having substantially constant quality characteristics.

It is a further object of this invention to produce, as a new composition of matter, an ester having characteristic properties which make it especially useful for certain purposes, as for use in lacquers or in varnishes or as substitutes for natural gums and resins.

Further objects of this invention will appear from the following description in which we have set forth the preferred embodiment of our invention. It is to be understood that the appended claims are to be accorded a range of equivalents consistent with the state of the prior art.

In the preferred method of carrying out the process of our invention, a suitable dihydric alcohol, as for example ethylene glycol is mixed with a dicarboxylic acid or its acid anhydrid, such as phthalic anhydrid. The mixture of the glycol and the phthalic anhydrid is heated in a suitable vessel, preferably one of nickel or one having a glass lining, to the melting point of the phthalic anhydrid in the glycol. A small amount of a catalyst is then added to the liquid as for instance silica gel in a fine state of division. The mixture is suitably agitated during the addition of the catalyst and this is continued together with the heating. When the temperature has been sufficiently elevated, say to 160° C., it will be found that what we term the first stage of the reaction between the dihydric alcohol and the dicarboxylic acid has substantially taken place and that the acid number is substantially half of the original.

The heating is then continued to a temperature still further elevated, say 180° C. and upwards, whereupon the evolution of water vapor takes place. The temperature is gradually raised, as the water vapor is evolved until a maximum has been obtained which is in the neighborhood of 230° C. Thus we have found that if the reaction between phthalic anhydrid and glycol be carried out at a temperature substantially in excess of 230° C. that the product secured has not its usual desirable properties, becoming darker in color and losing its transparency. Heating at this temperature is continued until the greater part of a molecular weight of water, as determined by measuring the condensed water, has been evolved. To facilitate the removal of water vapor, unreacted original components, and to effect the completion of the reaction, we preferably effect such continued heating under reduced pressure such as for example 10 millimeters of mercury. The second stage of the reaction may be judged to be complete when substantially all of the theoretical quantity of water has been evolved and the acid number has been reduced nearly to zero.

While we preferably use a gram molecular weight of the dihydric alcohol and a gram molecular weight of the dicarboxylic acid or its anhydrid, we have also found that a slight excess of one or the other may be employed.

We have found that a quantity of silica gel amounting to 2% by weight of the mixture may be expediently employed in hastening the reaction. The process may be carried on without it but a greater period of time is required. Other forms of silica or other finely divided solids such as diatomaceous earth may also be used with marked beneficial effects as we have set forth in our copending application, Serial No. 274,669, filed May 2, 1928.

While we have stated that ethylene glycol is one dihydric alcohol which may be employed, it is to be understood that we may utilize others. Thus we may also use a substituted ethylene glycol such as dimethyl ethylene glycol or the alpha methyl ethylene glycol.

We have also found that any polyhydric alcohol having more than two hydroxyls, as for instance glycerol, may be changed into a dihydric alcohol, suitable for use in our process, by esterifying with monocarboxylic acids, all hydroxyls save the two on adjacent carbon atoms and such alcohols, when reduced to dihydric forms, are included by us in the term "dihydric alcohol" in the claims. Thus glycerol may be esterified with acetic acid on the hydroxyl of the alpha carbon atom, to form monoacetin. This may then be esterified with phthalic anhydrid to form a cyclic ester which will not polymerize. The protection of the superfluous hydroxyls may be alkoxy as well as acyl. Instead of monoacetin, monobenzoin may be used, as may also any alpha alkyl or aryl ether of glycerol stable under the condition of the process.

We have also found that other dicarboxylic acids or their anhydrids may be substituted for phthalic anhydrid. Thus succinic acid and ethylene glycol may be reacted to form an ester which will not subsequently polymerize.

While we have found that the process most expediently carried out in esterifying phthalic anhydrid and ethylene glycol to be that which we have previously specified, it is to be understood that when other acids and alcohols are esterified by this process, each reaction has its specific optimum temperature and those specified for carrying out the reaction between phthalic anhydrid and ethylene glycol are given merely as an example for those particular reacting components. We have found that in carrying out the reaction between succinic acid and ethylene glycol that substantially the same temperatures may be used as those specified for ethylene glycol and phthalic anhydrid.

In like manner it is to be understood that while we have indicated that the second stage of our process is preferably carried out under reduced pressure this is only to facilitate the process and to reduce the time necessary to effect its completion. Thus the process may be carried out at atmospheric pressures, a longer time being required however.

The esters resulting from our process possess certain characteristic properties by which they are readily distinguished from esters produced by other processes. For example, the preferred product resulting from the reaction of ethylene glycol and phthalic anhydrid is a nearly colorless or a pale yellow or amber glass-like solid, which is transparent in thin layers, resembling shellac in hardness and fracture, and being soluble in acetone, ethyl acetate and other esters such as di-ethyl phthalate and having a molecular weight of 4000 by the freezing point method. It has a softening range between 70° and 80° C. melting into a free flowing liquid. It sets to a solid which is non-sticky at ordinary temperatures, and it may be crushed to a fine, free flowing powder which will not coalesce at ordinary temperatures.

Esters produced as a result of the process of our invention, having substantially no unreacted components present and not having any polymerizing tendencies, are especially useful for certain purposes. Thus the ester of ethylene glycol and phthalic anhydrid as directly produced by the above process and containing the esterification catalyst is especially suitable for use in producing embossed effects on printed matter such as we have described in our copending application, Serial No. 274,670, filed May 2, 1928. It may likewise be used in lacquers and varnishes and for other purposes for which natural gums and resins are ordinarily used.

The esters of our invention may be further identified by the fact that they are cyclic in character. In their simplest form they may be represented generically by the formula

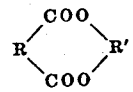

The cyclic esters of our invention may be further distinguished by the fact that they will not polymerize. Consequently they do not form the undesirable infusible, insoluble polymerization products common to other esters of polycarboxylic acids and polyhydric alcohols.

Another cyclic ester which may form as a result of the process of our invention may be represented thus

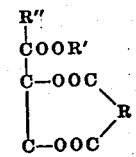

where the protection of the superfluous hydroxyls is acyl. The cyclic ester formed when the protection of the superfluous hydroxyls is alkoxy or aryl may be represented thus

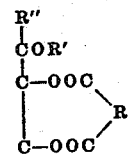

It is to be noted that the cyclic esters of our invention in which superfluous hydroxyls are present have these protected, as has been previously mentioned, in such a manner that the protection can be characterized as acyl, alkoxy or aryl. Our invention does not contemplate the protection of superfluous hydroxyls by a mineral acid constituent as is shown by Weinschenk in vol. 29, page 1311 of Chemiker-Zeitung for 1905, wherein the reaction of epichlorhydrin with phthalic anhydrid in the presence of a tertiary base is discussed. Weinschenk's final product, chlormethylglycolphthalic acid ester, has a superfluous hydroxyl protected by chlorine which, upon hydrolysis, is liberated to form undesirable hydrochloric acid. In this connection it is therefore desirable that the dihydric alcohol or the dicarboxylic acid be truly what they are termed and not include such a radical as a chlorine radical as does Weinschenk's epichlorhydrin which is not a true dihydric alcohol.

Other cyclic esters, produced by the process of our invention, have qualities substantially similar to that of the cyclic esters produced as the result of the reaction occurring with ethylene glycol and phthalic anhydrid. Thus the cyclic ester of phthalic anhydrid and monoacetin, which may be used for similar purposes, is a hard glass-like solid having a somewhat higher softening range than the glycolphthalic anhydrid cyclic ester.

The cyclic ester of monobenzoin and phthalic anhydrid is friable, closely resembling the resin of elemi and having a softening range beginning at about 90° C.

The cyclic ester of succinic acid and ethylene glycol closely resembles a hard wax. It is not particularly suitable for use in producing the embossed effects on printed matter because it has the unusual property of supercooling considerably below its melting point before solidifying. In its supercooled state it is a very sticky viscous material. It may be used, however, for other of the several uses which have been indicated.

The properties of the cyclic esters given above are for the products of the process of our invention in an impure state. Thus it appears that the resin-like character of the product obtained as the result of the reaction between ethylene glycol and phthalic anhydrid is due to the presence of small amounts of other products which are present in the unpurified reaction product.

We have found that the cyclic ester of ethylene glycol and phthalic anhydrid may be purified by crystalizing it from suitable solvents. In its pure state it is found to be not resin-like in character but a colorless crystalline solid having a melting point of 192° C. (uncorrected).

We claim:

1. Ethylene phthalate produced by esterifying a molecule of phthalic anhydrid and a molecule of ethylene glycol in the presence of silica gel as an esterification catalyst.

2. The esterification process comprising heating at about 160° C. a dihydric alcohol and a dicarboxylic acid in the presence of a finely divided solid neutral catalyst of the class of silica gel, diatomaceous earth and finely divided silica until acidity is substantially half the original acidity, then elevating the temperature to about 180° C. and finally heating at a temperature of about 230° C. and under reduced pressure to give a final neutral reaction mass containing said catalyst.

3. The process of claim 2 in which stochiometric quantities of the acid and alcohol are employed.

4. The process of claim 2 in which ethylene glycol and phthalic anhydrid are employed and the product has a molecular weight of about 4000.

5. The esterification process comprising heating equivalent weights of a dihydric alcohol and a dibasic acid to esterify the same only about half, and completing esterification by further heating under a reduced pressure.

6. The process of claim 5 in which a catalyst is present during the esterification and during the heating under reduced pressure.

LUDWIG ROSENSTEIN.
WALTER J. HUND.